(12) United States Patent
Buchner et al.

(10) Patent No.: US 9,864,497 B2
(45) Date of Patent: Jan. 9, 2018

(54) VEHICLE BALLASTING ASSISTANCE

(71) Applicant: AGCO INTERNATIONAL GMBH, Neuhausen am Rheinfall (CH)

(72) Inventors: Thiemo Buchner, Saal a.d. Donau (DE); Benno Pichmaier, Munich (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/514,116

(22) PCT Filed: Aug. 13, 2015

(86) PCT No.: PCT/EP2015/068660
§ 371 (c)(1),
(2) Date: Mar. 24, 2017

(87) PCT Pub. No.: WO2016/045869
PCT Pub. Date: Mar. 31, 2016

(65) Prior Publication Data
US 2017/0300219 A1    Oct. 19, 2017

(30) Foreign Application Priority Data
Sep. 26, 2014   (GB) .................................. 1416989.0

(51) Int. Cl.
G06F 3/048     (2013.01)
G06F 3/0484    (2013.01)
(Continued)

(52) U.S. Cl.
CPC .......... G06F 3/04847 (2013.01); B60K 35/00 (2013.01); B62D 49/085 (2013.01);
(Continued)

(58) Field of Classification Search
CPC ....................................................... G06F 3/048
See application file for complete search history.

(56) References Cited

U.S. PATENT DOCUMENTS

| 4,739,773 A | 4/1988 | West et al. |
| 4,821,744 A | 4/1989 | Turner et al. |
| 2013/0192905 A1 | 8/2013 | Janzen et al. |

FOREIGN PATENT DOCUMENTS

| EP | 2607159 A1 | 6/2013 |
| FR | 2651088 A1 | 3/1991 |

(Continued)

OTHER PUBLICATIONS

Deere 9030 series spreadsheet currently downloadable from http://www.deere.com/en_US/docs/agriculture/learn_more/tractors_ballast_calculator/9030_series_wheel_tractors_ballast_calc.xls.
PK Pranav and KP Pandey, Computer Simulation of Ballast Management for Agricultural Tractors, Journal of Terramechanics 45 (2008), pp. 185-192.
UK Intellectual Property Office, International Search Report prepared for Priority Application No. GB1416989.0, dated Mar. 26, 2015.

(Continued)

*Primary Examiner* — Peiyong Weng

(57) ABSTRACT

A method and system for assisting user selection of ballasting options for an agricultural vehicle when coupled to an agricultural implement. The user is presented with a selection menu of implement types, whereby each implement type defines operating ranges of discrete values for first, second and optionally third operational parameters of the vehicle, with the differing combinations defining a values subset. An optimal choice from the available ballasting options is made for each combination in the values subset, and a selection from the optimal choices based on prevalence or probability of occurrence is made and may be presented to the user. Operational parameters may include operating speed, loading due to implement weight and engine power.

10 Claims, 8 Drawing Sheets

(51) Int. Cl.
    *B62D 49/08*     (2006.01)
    *B60K 35/00*     (2006.01)
    *B62D 37/04*     (2006.01)
    *G06F 3/041*     (2006.01)
    *G06F 3/0482*     (2013.01)
    *G06F 3/0488*     (2013.01)

(52) U.S. Cl.
    CPC .......................... *B60K 2350/1004* (2013.01); *B60K 2350/106* (2013.01); *B60K 2350/1028* (2013.01); *B62D 37/04* (2013.01); *G06F 3/041* (2013.01); *G06F 3/0482* (2013.01); *G06F 3/0488* (2013.01)

(56) References Cited

FOREIGN PATENT DOCUMENTS

| | | |
|---|---|---|
| GB | 2024594 A | 1/1980 |
| GB | 2038604 A | 7/1980 |
| WO | 2013/0095239 A1 | 7/2012 |
| WO | 2013/013915 A1 | 1/2013 |
| WO | 2013/013917 A1 | 1/2013 |
| WO | 2013/178886 A1 | 12/2013 |

OTHER PUBLICATIONS

European Patent Office, International Search Report for International Application No. PCT/2015/068660; dated Jan. 30, 2015.

| Variant | Frontballast | Wheet ballast | Frequency |
|---|---|---|---|
| #1 | 0 kg | 0 kg | 3 |
| #2 | 2500 kg | 0 kg | 12 |
| #3 | 3300 kg | 0 kg | 11 |
| #4 | 2500 kg | 2500 kg | 2 |

| Variant | Frontballast | Wheet ballast | Weighted Sum |
|---|---|---|---|
| #1 | 0 kg | 0 kg | 25 |
| #2 | 2500 kg | 0 kg | 220 |
| #3 | 3300 kg | 0 kg | 150 |
| #4 | 2500 kg | 2500 kg | 15 |

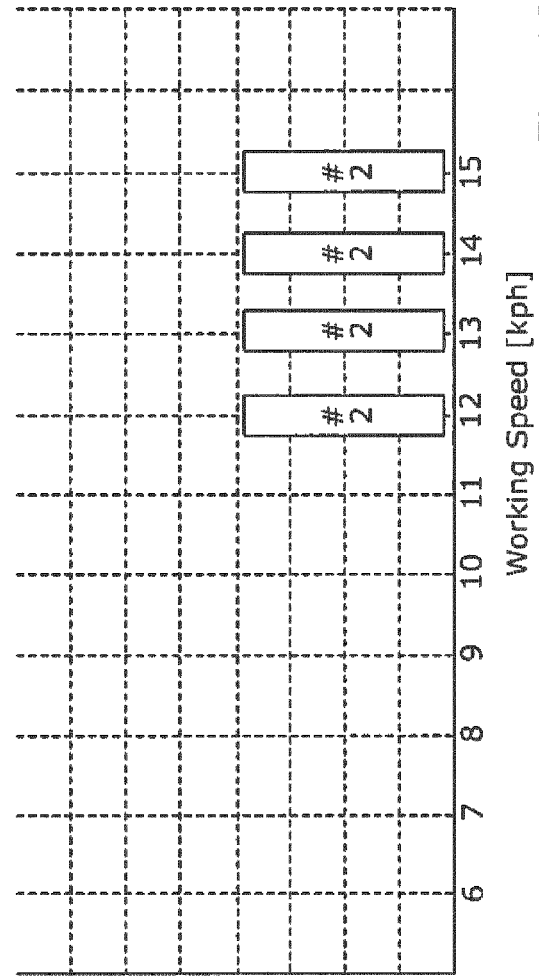

VEHICLE BALLASTING ASSISTANCE

BACKGROUND OF THE INVENTION

Field of Invention

The invention is related to tractors and other agricultural vehicles on which may be mounted various combinations of ballasting weights, and in particular to methods for enabling optimised selection from among the various combinations. The invention also relates to a programmable device configured to perform the method in response to input from a user and to a software utility for programming such a device.

Description of Related Art

It is known to attach ballast in the form of one or more additional weights to the front, rear or the wheels of an agricultural vehicle to counteract external forces mainly applied by implements attached. With agricultural tractors, most heavy implements are attached to the rear, and ballasting weights on wheels and at the front of the vehicle are very common. Rear mounted ballasting weights are used for front-loader operation.

The choice of the right ballast is very complex, as described for example in commonly-assigned International patent application WO2013/013915, due to the fact that several influencing parameters must be considered. If these parameters are known, it is a matter of mechanics to determine the ballast configuration. However, this requires extensive knowledge on the part of the operator which is not present in many cases, especially if untrained persons are concerned. Even a system just automatically requesting the parameters would overload the operator as much parameter data will not be available to them or depends on the operation in the field. Providing a system which receives the parameters without the operators input would require various sensors to determine the parameters and thereby be quite costly.

As an alternative approach, some standalone (offline) ballasting assistance systems calculate ballast weight by assuming average values for these parameters, but this results in vague ballasting recommendations. An example of such an offline ballasting assistance system is the Deere 9030 series spreadsheet currently downloadable from http://www.deere.com/en_US/docs/agriculture/learn_more/tractors_ballast_calculator/9030_series_wheel_tractors_ballast_calc.xls.

It is an object of the present invention to provide a method for optimising ballast weight selection and a ballasting assistance system for implementing the same which avoids at least some of the above-mentioned disadvantages.

OVERVIEW OF THE INVENTION

In accordance with the present invention there is provided a method for enabling user selection of one from a plurality of ballasting options for an agricultural vehicle when coupled to an agricultural implement, comprising:

presenting to a user a menu of selectable implement identifiers;

within a first range of discrete values of a first operational parameter of the vehicle and a first range of discrete values of a second operational parameter of the vehicle, using a user-selected identifier from said menu to look up a second range, less than or equal to the first range, of discrete values of the first parameter, and a second range, less than or equal to the first range, of discrete values of the second parameter to obtain a values subset from the combinations of discrete first and second operational parameter values;

deriving an optimal selection from the plurality of ballasting options for each combination in the values subset and identifying one derived ballasting option selection on the basis of a predetermined selection criteria.

By considering ranges of two or more operational parameters, tolerance for those factors such as hardness of ground (which will not generally be known at set up) may be incorporated in the decision as to which of the ballasting options available to a user would be optimal, that is to say most likely to be suited in a variety of conditions, without requiring the user having to consider anything beyond simple selection of an implement type. The operational parameters of the vehicle may include a working speed, a vertical load due to an implement on a connection between the said implement and the vehicle, and an engine loading, and user selection from the menu of implement types may bring three (or more) operational parameters into the ballasting option selection.

Also in accordance with the present invention there is provided a ballasting assistance system for an agricultural vehicle when coupled with an agricultural implement, the system comprising:

a display device;
user operable input means;
a data storage device; and
a data processing device in communication with the display device and the data storage device, the data processing device configured to select one from a plurality of stored ballasting options for the agricultural vehicle when coupled to a selected agricultural implement, by performing the steps of:

presenting to a user via the display device a menu of selectable implement identifiers;

receiving from the user operable input means selection of a presented implement identifier;

within a first range of discrete values of a first operational parameter of the vehicle and a first range of discrete values of a second operational parameter of the vehicle, using the user-selected identifier to look up in the data storage device a second range, less than or equal to the first range, of discrete values of the first parameter, and a second range, less than or equal to the first range, of discrete values of the second parameter to obtain a values subset from the combinations of discrete first and second operational parameter values;

deriving an optimal selection from the plurality of ballasting options for each combination in the values subset and identifying one derived ballasting option selection on the basis of a predetermined selection criteria.

The user operable input means and display device may be combined in a touch screen device and the received identifier may be obtained from a look-up table in the data storage device in response to user selection via the touch screen from a menu of implement types displayed. Alternately, the system may further comprise wireless communication means, with the received identifier being obtained from a remotely stored look-up table in response to user selection via the data processing device.

In a further aspect of the present invention there is provided a data storage device carrying data defining a software utility, said software utility when loaded to a data processing device in communication with a display device providing a ballasting assistance system for an agricultural vehicle coupled with an agricultural implement in which ballasting assistance system the data processing device is configured to select one from a plurality of stored ballasting options for the agricultural vehicle when coupled to the agricultural implement, by performing the steps of:

presenting to a user a menu of selectable implement identifiers;

within a first range of discrete values of a first operational parameter of the vehicle and a first range of discrete values of a second operational parameter of the vehicle, using a user-selected identifier from said menu to look up a second range, less than or equal to the first range, of discrete values of the first parameter, and a second range, less than or equal to the first range, of discrete values of the second parameter to obtain a values subset from the combinations of discrete first and second operational parameter values;

deriving an optimal selection from the plurality of ballasting options for each combination in the values subset and identifying one derived ballasting option selection on the basis of a predetermined selection criteria.

Further features and advantages are recited in the dependent sub-claims to which reference is now made.

BRIEF DESCRIPTION OF THE DRAWINGS

Embodiments of the present invention will now be described, by way of example only, with reference to the accompanying drawings in which:

FIG. 11 is a tabular representation of the results for a further example ballasting assistance calculation; and FIG. 12 is a graphical representation of the results from FIG. 11.

DETAILED DESCRIPTION OF THE INVENTION

A ballasting method embodying the present invention can be used in several systems, including:

OFFLINE-Ballasting assistance system (just application software and an associated interface running on a programmable device or on a vehicle such as a tractor without any measurements/input from machinery).

OFFLINE-Ballasting assistance system in combination with a tyre pressure control system to adapt tyre pressure on the machinery including parameter input (e.g. by wheel load sensors).

ONLINE Ballasting assistance on a tractor including tyre pressure control.

The system is described initially on the basis of an OFFLINE ballasting assistance.

Figure 1:
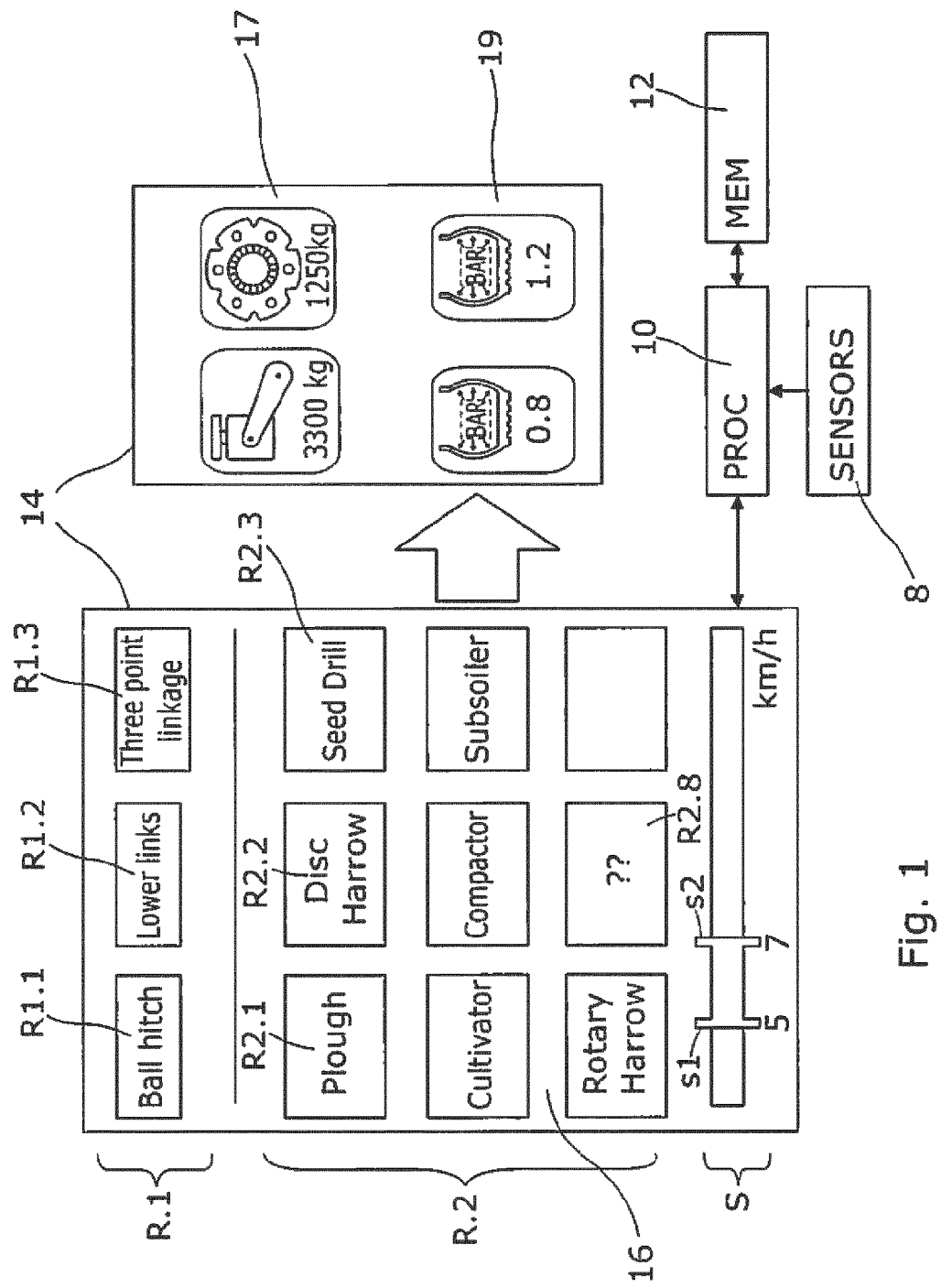
FIG. 1 schematically represents the components of a first embodiment of ballasting assistance system and user interface.

FIG. 1 schematically represents the components of a programmable device suitable to implement the method of ballasting suggestion determination for a given combination of tractor and implement. A processor 10 is coupled with a memory 12 holding processor code and ancillary vehicle data which will be described in further detail below. A human-machine interface (HMI) 14 coupled with the processor 10 may suitably comprise a touch-screen device, although a simple display screen and separate user control means such as a keyboard, joystick or mouse may also be used. The programmable device may be a separate stand-alone device (for OFFLINE operation) such as a laptop or tablet computer or smartphone, or it may be integrated with the control electronics and display of the tractor or other agricultural vehicle to which the ballasting suggestion will relate. Where the device is a standalone device, it may nonetheless have means to establish wireless communication with remote locations (for example via the internet) where vehicle data is stored.

Figure 2:
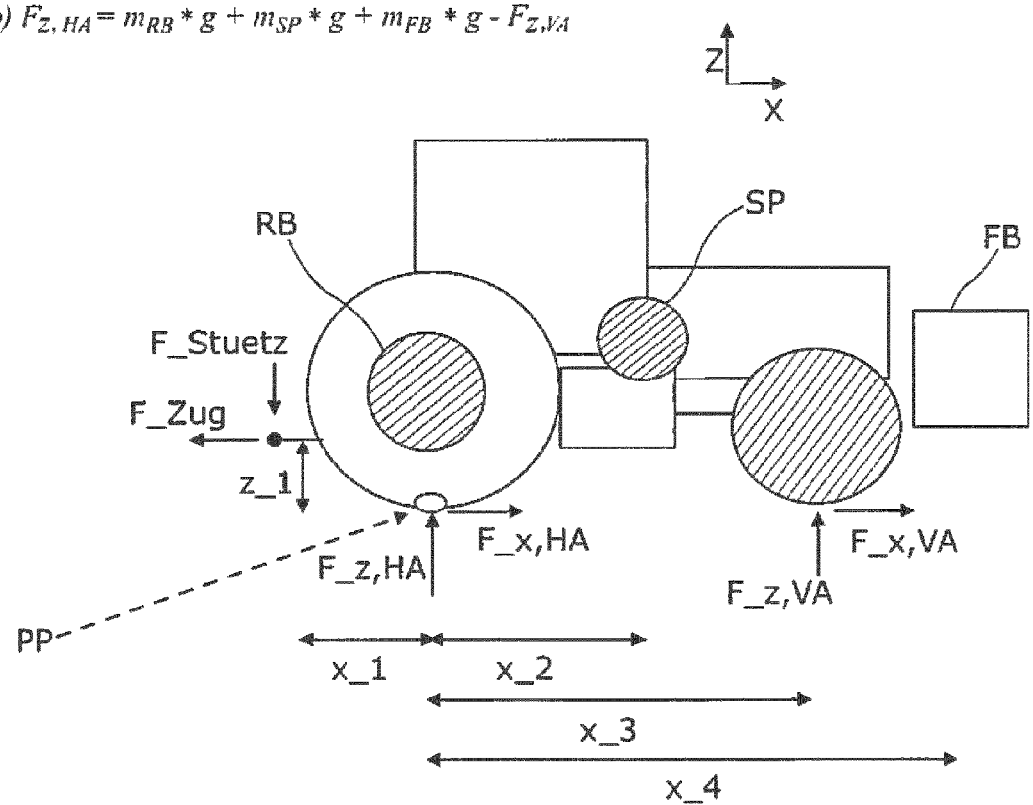
FIG. 2 is a schematic representation of a tractor carrying ballasting weights.

The figure shows a main menu 16 displayed on the HMI 14 with a first row R.1 of input buttons (or touch sensitive areas) allow the operator to define how the implement is attached to the tractor, with R1.1 indicating a trailed implement, R1.2 indicating semi-mounted, and R1.3 fully mounted. The mode of attachment influences the mechanical balancing about a pivot point (PP; FIG. 2) and the respective equations used for determination of optimal ballasting selection as explained later.

A second set of interface input buttons R.2 allows the operator to input the type of attached implement, such as a plough (button R2.1), disc harrow (R2.2) or seed drill (R2.3). In contrast to other ballasting assistance systems, the choice of a generic implement type does not set predetermined values to be considered during calculation but instead delivers from memory 12 a range for some of the parameters. This arrangement is simple to understand and use for an unskilled operator. One or more buttons R2.8 may be assigned to specific implements of a user for which the optimal ballasting selection has previously been made and stored. A further optional input area S provides a pair of sliders s1, s2 enabling a more skilled user to input an operating speed range as minimum and maximum values (5-7 km/h in the example) which input values may be set to override any stored values for the speed range in subsequent calculations. Where the stored value takes precedence over user input, the area S may simply be used to provide a visual indicator of a stored speed range to the user.

As an example the vehicle operating parameter values stored for "Plough" (button R2.1) may be:

vertical load (shown as F_Stuetz in FIG. 2): 0-3 tonnes
working speed: 8-12 km/h
Engine load: >90%

Further parameters beyond load and speed may be stored. For example, since a seed drill is not only dragged over ground but also has hydraulic drives driven during field operation, a Power Split value is also stored, containing the ratio between power used to drag the implement and used to drive hydraulic or pneumatic drives.

As an example the values stored for "Seed Drill" (button R2.3) may be:
vertical load: 1-6 tonnes
working speed: 12-16 km/h
Engine load: >90%
Power split (hydraulic/drag): 40/60

In this arrangement, some of the values for each implement are stored as ranges in order to recognise the fact that for example the vertical load depends on factors including the working depth and ground condition (soft soil, hard soil etc.), both of which will be unknown when using the present ballasting assistance system.

The system also considers parameters which are predetermined by the vehicle manufacturer, namely the geometric relations which influence the force balance are defined by vehicle data, including wheel separation, centre of gravity, and vehicle weight. FIG. 2 schematically represents a number of these parameters, including:

RB Rear axle-mounted ballast
SP Centre of gravity (mass and position) for unloaded vehicle
FB Front ballast
x_1 horizontal separation of hitch point and pivot point PP
x_2 horizontal separation of pivot point PP and SP
x_3 horizontal separation of pivot point PP and centre of front axle
x_4 horizontal separation of pivot point PP and FB mounting
z_1 vertical separation of hitch point and pivot point PP
F_Zug drag force
F_Steutz vertical load on hitch point
F_z, HA wheel load on rear axle(s)
F_z, VA wheel load on front axle(s)

Furthermore details of the power flow or other parameters are predetermined depending on vehicle configuration, such as:

Nominal engine performance (say 500 hp/373 kW),
Overall efficiency between motor and wheel (for calculating F_U, F_Zug)
Optimal distribution of wheel load (ceta_opt): ceta=F_z, VA/F_z, HA
Assumed average slippage of the wheel on ground In addition to this detail about the physical parameters of the unloaded vehicle, the stored data on which the derivation is based also includes available ballast variants. In a new machine scenario, the range of ballast variants may be taken from the manufacturer's price list. Once delivered, the system may be configured to give an operator the choice to add or reduce the list depending on the weight availability (for example to restrict the choice only to those ballast weights that the operator owns or may borrow from neighbours).

Figure 3:
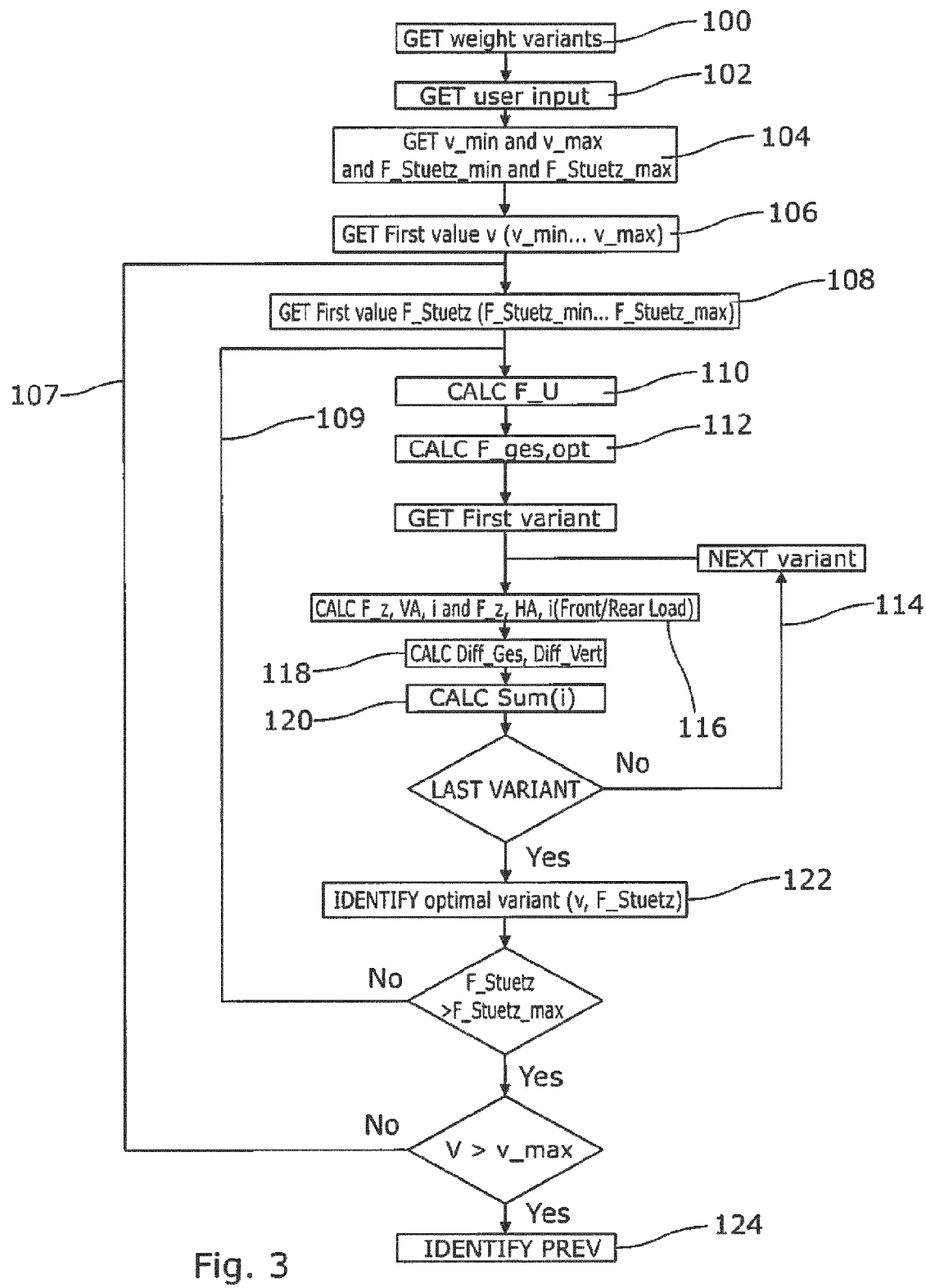
FIG. 3 is a flow chart of a method for selecting one from a plurality of available ballasting options.

The general method for optimal ballast determination by the on-board or ancillary system of the tractor or other agricultural vehicle, is represented by the flow chart of FIG. 3. Based on the available front and axle weights, at step 100 the system determines a range of ballast combination variants (combinations of front/wheel and/or rear ballasting weight options), an example of which is given in the table of FIG. 4, ranging from zero ballasting on front end and wheels (variant #1) to maximum available 2500 kg on each of front end and wheels (variant #4). In the following example, front and wheel ballasting options only are considered, but this is not limiting.

Returning to FIG. 3, at step 102, the drivers input regarding the implement and the attachment condition is obtained via menu 16 (FIG. 1) enabling the processor 10 to determine in step 104 the range of values for working speed (v_min . . . v_max), vertical load (F_Stuetz_min . . . F_Stuetz_max) and the discrete values for engine load and Power split (hydraulic/drag, if applicable for the type of implement) from storage in memory 12.

Taking the above example values stored for "Seed Drill" (button R2.3) into the example, at step 106 a first value v within the range of working speeds is taken (e.g. 12 km/h). Next is the start of a loop 107 which is repeated across the range of discrete values of working speed v. The first operation in loop 107, at step 108, is to take a first value within the range of discrete values of vertical loads F_Stuetz (e.g. 1 tonne). The following loop 109 is repeated across the range of vertical loads F_Stuetz_min F_Stuetz_max before the next value of speed v is selected prior to the next iteration of loop 109. As will be recognised, the number of loops 107, 109 processed thereby depends on the chosen increment between the discrete values within the ranges of these operational parameters.

At the start of loop 109, at step 110, the sum of the circumferential forces of the wheels (at point PP) F_U is obtained. In an offline mode, this may be derived from engine performance data, engine load (optionally input by an skilled user), and efficiency factor assumptions (assumed from vehicle configuration and working speed or received as skilled user directly input data). In an online mode, F_U may be obtained from sensor monitoring of gearbox fluid pressure and rotation speed.

At step 112, the optimal total wheel load F_Ges,opt is calculated by the formula $$F\_Ges,opt = F\_U/mue\_opt$$

where mue_opt is a factor determined by environmental conditions of the ground being worked and typically ranges from 0.51 (hard) to 0.55 (easy) with 0.53 a typical intermediate value. Additional user input may include a qualitative estimation of the environmental conditions (weather, terrain, soil), such as "easy", "normal", "difficult": with this information the value of mue_opt can be adjusted.

In the loop indicated generally at 114, for each of the available ballast variants identified in step 100, the first step 116 is calculation of the respective front (F_z, VA) and rear (F_z, HA) wheel axle loads depending on the ballast variant, and based on the operator-identified type of device and implement connection type (which in turn enables look-up of hitch loading F_Stuetz). The additionally required drawbar pull is derived from F_U by assuming an average slippage and rolling resistance.

Next in the loop, at step 118 and taking the axle loadings from step 116, calculation of the differential current to the optimum value is performed according to:

$$Diff\_Ges = (F\_z,HA + F\_z,VA) - F\_Ges,opt$$

and differential current of the optimum distribution of the wheel load (Diff_Vert), according to:

$$Diff\_Vert = (F\_z,VA/F\_z,HA) - ceta\_opt$$

where the optimal distribution of wheel load (ceta_opt) is a predetermined parameter. For conventional tractors with a smaller front and larger rear wheel, ceta_opt=0.667 is a common assumption, which is a distribution of 60% load on the rear axle and 40% on the front axle.

At step 120 the differential currents from step 118 in loop 114 are assessed, with the sum for each ballast variant i being:

$$sum(i) = w\_mue*|Diff\_Ges| + w\_ceta*Diff\_Vert$$

with w_mue and w_ceta being free selectable weighting factors.

Steps 114-120 are repeated until the each/last ballast variant has been processed providing sum(i) for each ballast variant. In step 122, the optimal ballast variant (jth variant) is determined as being the one whose sum (i) is the smallest compared with all the other ballast variants (wherein the ideal case is zero).

Steps 114-120 are repeated to give an array of optimum ballast selections (from currently available ballast options) based on two or more factors selected from hitch loading weight (vertical load F_Stuetz), working speed v, engine load and hitch type/geometry.

Figures 4, 5:
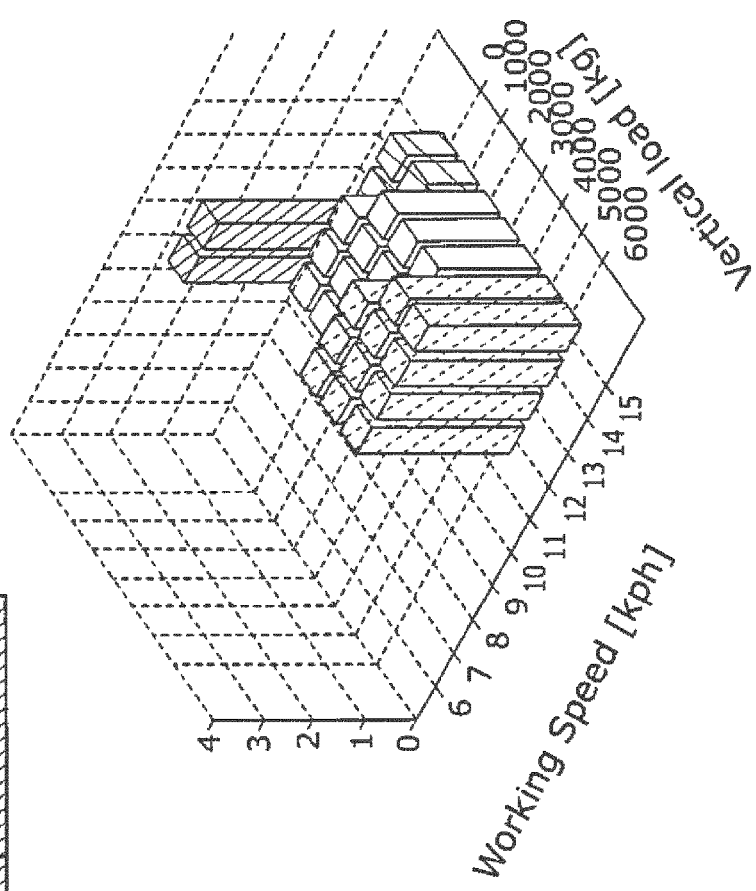
FIG. 4 is an example table of ballasting options from combinations of available ballasting weights.
FIG. 5 is a graphical representation of a first set of optimal ballast option results for differing combinations of vehicle operating parameter.

After repeating loops 107 and 109 (with steps 106 and 108) an optimal ballast variant is determined for each value of working speed and vertical load as shown in FIG. 5 illustrating a 3D table of optimum ballast option selections across the range of working speed/vertical load and applied weight options for the chosen implement options.

Figures 6, 7:
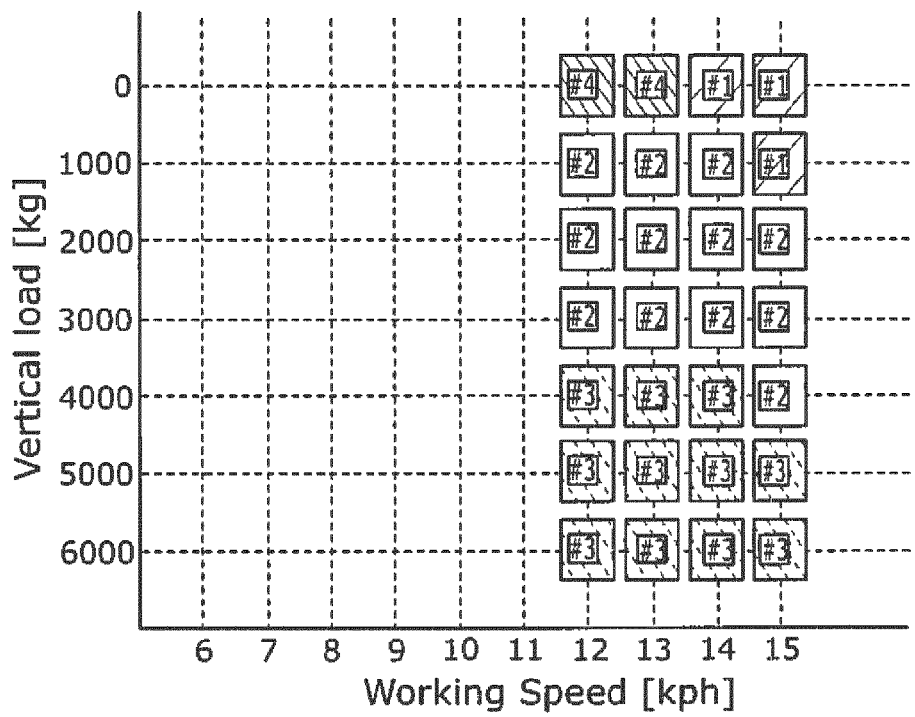
FIG. 6 is a graphical representation of a further set of optimal ballast option results for differing combinations of vehicle operating parameter (values subset) with selection of an implement.
FIG. 7 is a tabular representation of the results from FIG. 6.

The 3D table of FIG. 5 enables identifying of the final optimum ballasting variant at step 124 in FIG. 3 with a preference for selection being based on prevalence: in other words, the system determines the ballast variant which was chosen the most within the range of operation for the selected implement. As best seen in FIGS. 6 and 7 for the seed drill parameters given above, the system would recommend ballast variant #2 as it was considered 12 times. Referring back to FIG. 1, a ballasting recommendation indicated at 17 is displayed to the user via HMI 14, and may optionally be stored with a reference to the selected implement for subsequent recall by assignable button R2.8.

Figures 8, 9:
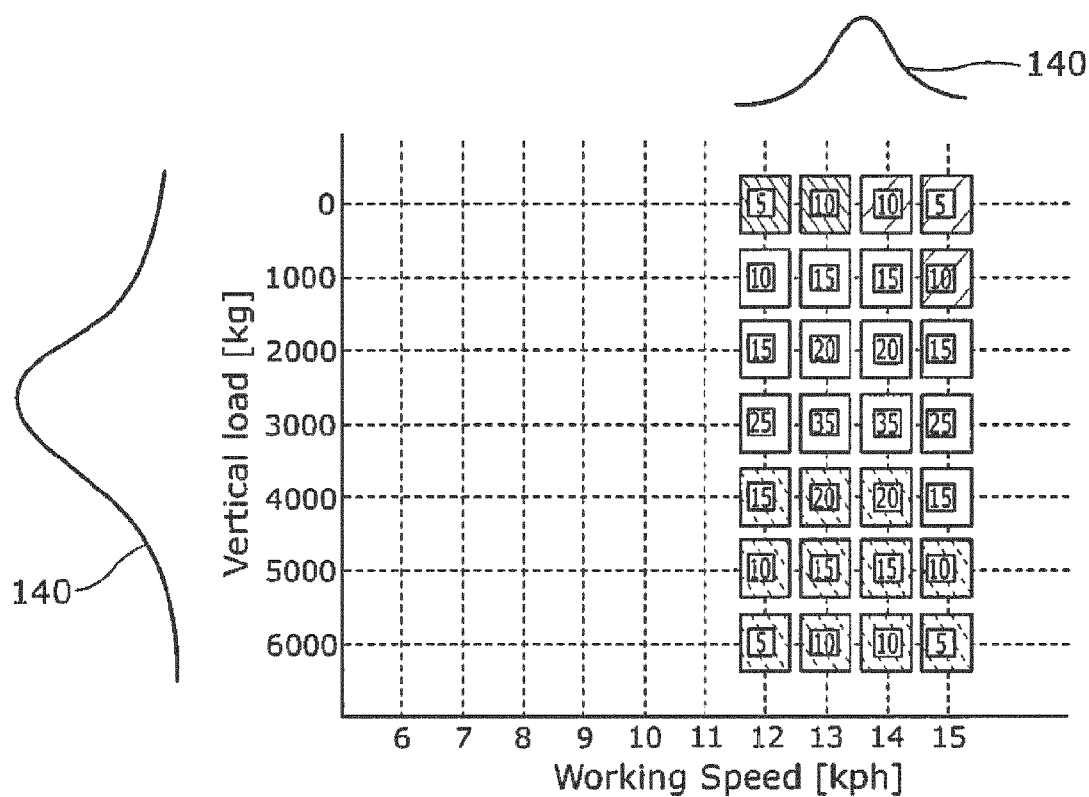
FIG. 8 is a modified version of the graphical representation of FIG. 6 with weighted selection criteria.
FIG. 9 is a tabular representation of the results from FIG. 8.

An alternative method to determine the ballast recommendation is shown in FIGS. 8 and 9. Instead of using simple prevalence the alternative method chooses the final optimum ballasting variant at step 124 in FIG. 3 with a preference for selection being based on probability of occurrence. In other words, the system considers the fact that ballast variants at the edges of the ranges of working speed and vertical load may be less adequate than the ones distant to the edges. In this arrangement, ballast recommendations resulting from minimum or maximum values for working speed and vertical load are deducted. Mathematically the method of bivariate normal distribution or bivariate Gaussian distribution (http://en.wikipedia.org/wiki/Multivariate_normal_distribution) is used and explained in FIG. 8.

Based on Gaussian distribution (as schematically shown with graphs 140), each of the ballasting variants determined at step 124 is given a probability of occurrence. The ballast variant with the highest overall sum is then selected. In FIGS. 8 and 9, the system would recommend ballast variant #2 as the overall sum for probability of occurrence was 220.

Figure 10:
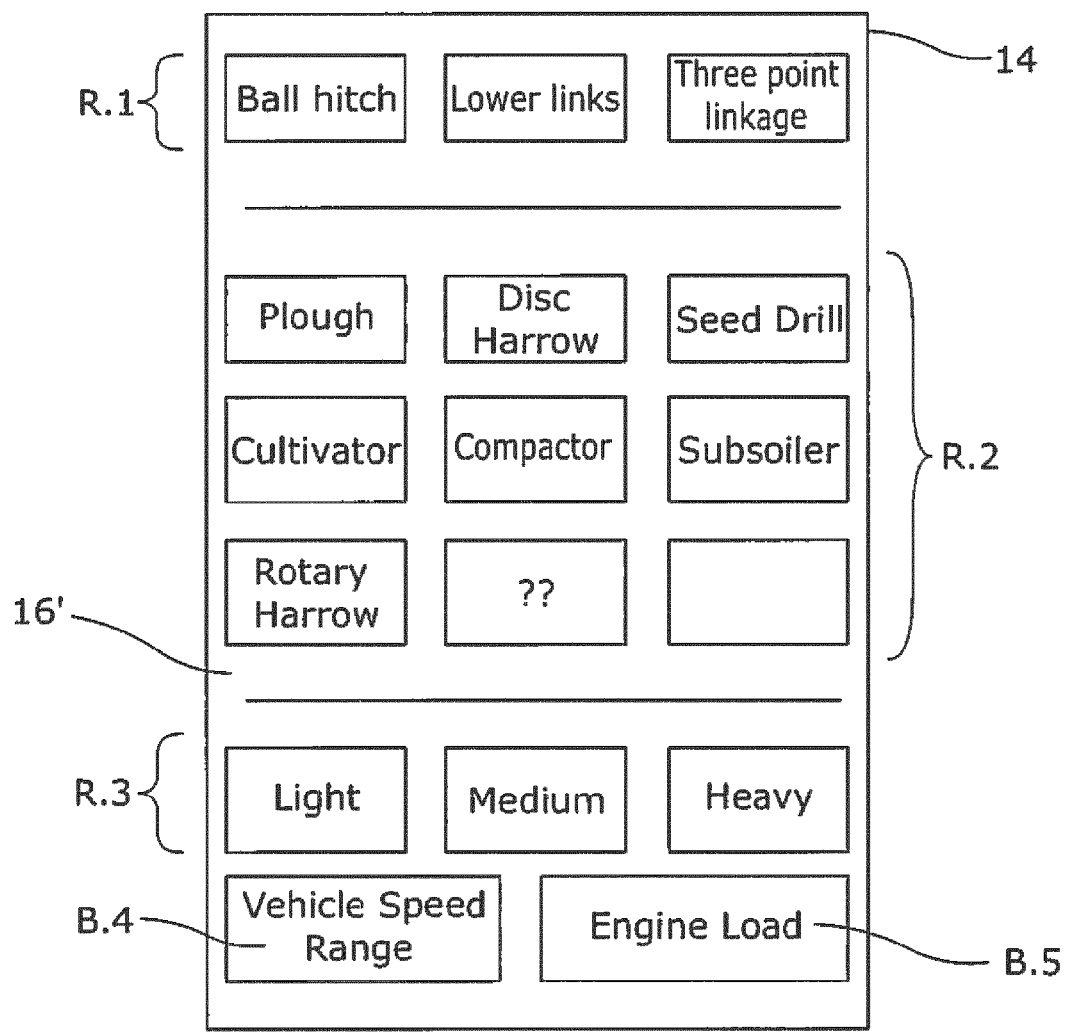
FIG. 10 represents a user interface for a further embodiment of ballasting assistance system.

FIG. 10 shows an alternative menu 16' displayed on HMI 14 similar to that of FIG. 1 but with extra inputs to provide an Expert Mode for a skilled operator. With the additional row R3 such an operator can input an operating condition (soil humidity etc.) so that mue_opt is adapted. Buttons B.4 and B.5 can be used to limit the range or enter an exact value for working speed range (B.4—as alternative to the slider space S of FIG. 1) and engine load (B.5). This input preferably overrides predetermined settings stored for implement (accessed by the buttons of rows R.2).

As mentioned above, the invention may additionally be embodied in an ONLINE ballasting/tyre pressure assistance system. Such a system is additionally provided with means in the form of sensors (8; FIG. 1) coupled with the processor 10 to determine parameters:

F_U can be calculated based on CVT parameters such as gearbox fluid pressure and rotation speed (as described in the above-referenced WO2013/013915);

F_z (wheel load for front and rear axle) can be determined by pressure sensors in the front axle and axle load sensors on the rear (as described in commonly-assigned International patent application WO2013/104981).

In the ONLINE Mode the operator enters the current ballasts attached. The system can determine the difference to ideal ballast accordingly. The operator can then be informed about:

1. Optimum tyre pressure for the current ballast
2. Optimum ballast
3. Optimum tyre pressure in combination with the optimum ballast (e.g. at 19, FIG. 1).

A third embodiment of assistance system comprises the OFFLINE ballasting assistance in combination with an ONLINE tyre pressure assistance. In this case the rear wheel is not equipped with a wheel load sensor so that the OFFLINE ballasting assistance method is used to generate ballasting suggestions while alternative means such as an ultrasonic sensor is used at the rear to detect tyre pressure (by measuring distance between wheel rim bead and contact surface).

Although the above examples are given in terms of ballasting of a tractor front end and rear wheels, it will be readily understood that it may equally be applied to other weight distribution arrangements, for example with weighting on the rear linkage to counteract a front-linkage coupled implement. Other variations are possible and, as will be recognised, the method may be extended to incorporate a first range of a third operational parameter of the vehicle (for example engine load) and a second range, less than or equal to the first range, of discrete values of the third parameter to identify a three dimensional subset of derived ballasting option selections. As above, selection based on prevalence or probability within the subset is used to identify the recommended ballasting option.

In another variation, a full set of optimal ballast selections may be made across the range of vehicle operating (speed/weight) parameters. Having identified a fully populated version of the 3D table of FIG. 5, the identity of the attached implement is then used to identify a second range, less than or equal to the first range, of discrete values of the first parameter (e.g. operating speed), and a second range, less than or equal to the first range, of discrete values of the second parameter (e.g. torque loading on the implement attachment of the vehicle such as a front or rear hitch) to identify a subset of the derived ballasting option selections. This subset or range of values enables identifying of a number of optimum ballasting option selections with a preference for selection being based on prevalence or probability within the subset, as above. Referring back to FIG. 1, the ballasting recommendation (by whichever method attained) is suitably displayed to the user at 17 via HMI 14, and may optionally be stored with a reference to the selected implement.

In a further variation, selection from the derived ballasting option selections may be made by a user following presentation of a graphic representation of the options. For example, when presented with a display equivalent to FIG. 6, especially if the different options were differently colour coded, a user would easily recognise that option #2 is most suited in terms of both prevalence and distribution across the subset. Alternatively, the user may have a better understanding of the operational parameters (e.g. which working speed is best) and may be enabled to choose just from the ballasts assigned to the respective working speed.

For assisting selection by the user, the graphic representations shown in FIG. 5, 6 or 8 may be simplified. Knowing that it may be much easier for a user to select a ballast by considering the working speed rather than the vertical load (as working speed is a parameter which can be easily experienced), the system may eliminate one parameter. With reference to the method described in connection with FIG. 8, using probability of occurrence the system may apply the method only to determine an optimal ballasting selection at each of a number of working speeds instead of applying the method to the complete speed range. Referring to FIGS. 11 and 12, and similar to FIG. 8, each of the ballasting variants is given a probability of occurrence. The ballast variant with the highest overall sum for a single working speed is determined, as in the table shown in FIG. 11, and then shown in a graph, as at FIG. 12. The driver can then decide which working speed he prefers and chose the respective ballast variant.

In a still further variation, the driver may be presented with a menu enabling selection of a ballast variant, with the system then presenting further ballast variants, determined as above, for a predetermined range of values of e.g. working speed and/or vertical load. As an example, where the driver has selected a certain ballast configuration, the system will determine alternative ballast configurations and then present to the driver a graphic indicating the range of working speeds for which the selected ballasting is acceptable, too low, or too high.

In the foregoing we have described a method and system for assisting user selection of one from a plurality of available ballasting options for an agricultural vehicle when coupled to an agricultural implement. The user is presented with a selection menu of implement types, whereby each implement type defines operating ranges of discrete values for first, second and optionally third operational parameters of the vehicle, with the differing combinations defining a values subset. An optimal choice from the available ballasting options is made for each combination in the values subset, and a selection from the optimal choices based on prevalence or probability of occurrence is made and may be presented to the user. Operational parameters may include operating speed, loading due to implement weight and engine power.

The invention claimed is:

1. A method for enabling user selection of one from a plurality of ballasting options for an agricultural vehicle when coupled to an agricultural implement, comprising:
   presenting to a user a menu of selectable implement identifiers;
   within a first range of discrete values of a first operational parameter of the vehicle and a first range of discrete values of a second operational parameter of the vehicle, using a user-selected identifier from said menu to look up a second range, less than or equal to the first range, of discrete values of the first parameter, and a second range, less than or equal to the first range, of discrete values of the second parameter to obtain a values subset from the combinations of discrete first and second operational parameter values;
   deriving an optimal selection from the plurality of ballasting options for each combination in the values subset and identifying one derived ballasting option selection on the basis of a predetermined selection criteria.

2. The method as claimed in claim 1, wherein the predetermined selection criteria is prevalence of a particular one of the plurality of ballasting options within the values subset.

3. The method as claimed in claim 1, wherein the predetermined selection criteria is probability of occurrence of a particular one of the plurality of ballasting options within the values subset.

4. The method as claimed in claim 1, wherein the predetermined selection criteria is a user selection in response to a presented visual representation of the values subset.

5. The method as claimed in claim 1, wherein each user selectable implement identifier further identifies a first range of discrete values of a third operational parameter of the vehicle to give a values subset as combinations of discrete first, second and third operational parameter values prior to the step of deriving an optimal selection.

6. The method as claimed in claim 1, further comprising storing an identified one ballasting option selection by reference to an identifier for an individual coupled agricultural implement.

7. The method as claimed in claim 6, further comprising adding to the user selectable menu an implement identifier for said individual coupled agricultural implement.

8. A ballasting assistance system for an agricultural vehicle when coupled with an agricultural implement, the system comprising:
   a display device;
   user operable input means;
   a data storage device; and
   a data processing device in communication with the display device and the data storage device, the data processing device configured to select one from a plurality of stored ballasting options for the agricultural vehicle when coupled to a selected agricultural implement, by performing the steps of:
      presenting to a user via the display device a menu of selectable implement identifiers;
      receiving from the user operable input means selection of a presented implement identifier;
      within a first range of discrete values of a first operational parameter of the vehicle and a first range of discrete values of a second operational parameter of the vehicle, using the user-selected identifier to look up in the data storage device a second range, less than or equal to the first range, of discrete values of the first parameter, and a second range, less than or equal to the first range, of discrete values of the second parameter to obtain a values subset from the combinations of discrete first and second operational parameter values;
      deriving an optimal selection from the plurality of ballasting options for each combination in the values subset and identifying one derived ballasting option selection on the basis of a predetermined selection criteria.

9. The ballasting assistance system as claimed in claim 8, wherein the user operable input means and display device are combined in a touch screen device and the received identifier is obtained from a look-up table in the data storage device in response to user selection via the touch screen from a menu of implement types displayed.

10. A data storage device carrying data defining a software utility, said software utility when loaded to a data processing device in communication with a display device providing a ballasting assistance system for an agricultural vehicle coupled with an agricultural implement in which system the data processing device is configured to select one from a plurality of stored ballasting options for the agricultural vehicle when coupled to the agricultural implement, by performing the steps of:
- presenting to a user a menu of selectable implement identifiers;
- within a first range of discrete values of a first operational parameter of the vehicle and a first range of discrete values of a second operational parameter of the vehicle, using a user-selected identifier from said menu to look up a second range, less than or equal to the first range, of discrete values of the first parameter, and a second range, less than or equal to the first range, of discrete values of the second parameter to obtain a values subset from the combinations of discrete first and second operational parameter values;
- deriving an optimal selection from the plurality of ballasting options for each combination in the values subset and identifying one derived ballasting option selection on the basis of a predetermined selection criteria.

* * * * *